(12) United States Patent
Kodama et al.

(10) Patent No.: US 10,675,920 B2
(45) Date of Patent: Jun. 9, 2020

(54) PNEUMATIC TIRE

(71) Applicant: The Yokohama Rubber Co., LTD., Minato-ku, Tokyo (JP)

(72) Inventors: Yuji Kodama, Hiratsuka (JP); Masataka Koishi, Hiratsuka (JP); Kenichiro Endo, Haratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/277,955

(22) Filed: Feb. 15, 2019

(65) Prior Publication Data

US 2019/0176541 A1 Jun. 13, 2019

Related U.S. Application Data

(62) Division of application No. 14/408,292, filed as application No. PCT/JP2013/067138 on Jun. 21, 2013, now abandoned.

(30) Foreign Application Priority Data

Aug. 7, 2012 (JP) ................... 2012-175312

(51) Int. Cl.
*B60C 3/06* (2006.01)
*B60C 13/02* (2006.01)
*B60C 11/01* (2006.01)
*B60C 5/12* (2006.01)

(52) U.S. Cl.
CPC ............. *B60C 13/02* (2013.01); *B60C 5/12* (2013.01); *B60C 11/01* (2013.01); *B60C 3/06* (2013.01)

(58) Field of Classification Search
CPC .................................. B60C 13/02; B60C 3/06
See application file for complete search history.

(56) References Cited

U.S. PATENT DOCUMENTS

| | | | |
|---|---|---|---|
| 2011/0094646 A1* | 4/2011 | Watanabe | B60C 3/04 152/523 |
| 2012/0085473 A1* | 4/2012 | Matsuo | B60C 1/0025 152/523 |
| 2012/0097304 A1* | 4/2012 | Kojima | B60C 13/02 152/523 |
| 2014/0124116 A1 | 5/2014 | Waki | |

FOREIGN PATENT DOCUMENTS

| | | | | |
|---|---|---|---|---|
| EP | 1834812 A1 * | 9/2007 | ............ | B60C 13/02 |
| JP | 2001-130223 | 5/2001 | | |
| JP | 2006-117080 | 5/2006 | | |
| JP | 2009160993 A * | 7/2009 | | |
| JP | 2010163143 A * | 7/2010 | | |

(Continued)

OTHER PUBLICATIONS

Machine Translation: WO-2009017167-A1; Miyasaka Atsushi; (Year: 2019).*

(Continued)

*Primary Examiner* — Kendra Ly
(74) *Attorney, Agent, or Firm* — Thorpe North & Western

(57) ABSTRACT

A circumferential direction protrusion is provided extending longitudinally mainly along a tire circumferential direction on a side outward in a tire radial direction from a maximum tire width position on at least a first tire side portion of a tire.

5 Claims, 17 Drawing Sheets

(56) References Cited

FOREIGN PATENT DOCUMENTS

| JP | 2012176703 A | * | 9/2012 | ............ B60C 13/02 |
|----|---|---|---|---|
| JP | 2013071659 A | * | 4/2013 | |
| WO | WO-2009017167 A1 | * | 2/2009 | ............ B60C 13/02 |
| WO | WO 2012/161312 | | 11/2012 | |

OTHER PUBLICATIONS

Machine Translation: JP-2012176703-A; Inoue, Hirobumi; (Year: 2019).*
Machine Translation: JP-2013071659-A; Kubota, Masatake; (Year: 2020).*
Machine Translation: JP-2010163143-A; Watanabe, Takeshi; (Year: 2020).*
Machine Translation: JP-2009160993-A; Inoue, Takumi; (Year: 2020).*

* cited by examiner

TIRE CIRCUMFERENTIAL DIRECTION

TIRE CIRCUMFERENTIAL DIRECTION

| | Conventional Example | Comparative Example | Working Example 1 | Working Example 2 | Working Example 3 | Working Example 4 | Working Example 5 | Working Example 6 | Working Example 7 | Working Example 8 | Working Example 9 |
|---|---|---|---|---|---|---|---|---|---|---|---|
| Arrangement of circumferential direction protrusion (Reference diagram) | × | × | O (FIG. 2) | O (FIG. 17) | O (FIG. 18) | O (FIG. 19) | O (FIG. 2) | O (FIG. 2) | O (FIG. 2) | O (FIG. 2) | O (FIG. 2) |
| Circumferential direction protrusion projection height (mm) | — | — | 2 | 2 | 2 | 2 | 3 | 10 | 5 | 5 | 5 |
| Circumferential direction protrusion width (mm) | — | — | 0.4 | 0.4 | 0.4 | 0.4 | 3.5 | 3.5 | 0.5 | 5 | 3.5 |
| Arrangement of radial direction protrusion (Reference diagram) | × | O (FIG. 23) | × | × | × | × | × | × | × | × | × |
| Radial direction protrusion projection height (mm) | — | 0.9 | — | — | — | — | — | — | — | — | — |
| No. of radial direction protrusions in tire circumferential direction (No.) | — | 9 | — | — | — | — | — | — | — | — | — |
| Radial direction protrusion width (mm) | — | 0.4 | — | — | — | — | — | — | — | — | — |
| Arrangement of circumferential direction protrusion on vehicle | — | — | Vehicle inner side | Vehicle inner side | Vehicle inner side | Vehicle inner side | Vehicle inner side | Vehicle inner side | Vehicle inner side | Vehicle inner side | Vehicle inner side |
| Arrangement of radial direction protrusions on vehicle | — | Vehicle Outer Side | — | — | — | — | — | — | — | — | — |
| Fuel economy improvement rate | 100 | 100 | 100.1 | 100.1 | 100.1 | 100.1 | 100.2 | 100.2 | 100.2 | 100.2 | 100.2 |

FIG. 30A

| | Working Example 10 | Working Example 11 | Working Example 12 | Working Example 13 | Working Example 14 | Working Example 15 | Working Example 16 | Working Example 17 | Working Example 18 | Working Example 19 |
|---|---|---|---|---|---|---|---|---|---|---|
| Arrangement of circumferential direction protrusion (Reference diagram) | O (FIG. 2) | O (FIG. 2) | O (FIG. 2) | O (FIG. 2) | O (FIG. 2) | O (FIG. 2) | O (FIG. 2) | O (FIG. 2) | O (FIG. 2) | O (FIG. 2) |
| Circumferential direction protrusion projection height (mm) | 5 | 1 | 10 | 5 | 5 | 5 | 5 | 5 | 5 | 5 |
| Circumferential direction protrusion width (mm) | 3.5 | 5 | 5 | 3.5 | 3.5 | 3.5 | 3.5 | 3.5 | 3.5 | 3.5 |
| Arrangement of radial direction protrusion (Reference diagram) | O (FIG. 23) | O (FIG. 23) | O (FIG. 23) | O (FIG. 23) | O (FIG. 23) | O (FIG. 23) | O (FIG. 23) | O (FIG. 23) | × | O (FIG. 23) |
| Radial direction protrusion projection height (mm) | 0.9 | 1 | 10 | 5 | 5 | 5 | 5 | 5 | — | 5 |
| No. of radial direction protrusions in tire circumferential direction (No.) | 9 | 20 | 20 | 10 | 50 | 20 | 20 | 20 | — | 20 |
| Radial direction protrusion width (mm) | 0.4 | 3.5 | 3.5 | 3.5 | 3.5 | 0.5 | 5 | 3.5 | — | 3.5 |
| Arrangement of circumferential direction protrusion on vehicle | Vehicle inner side | Vehicle inner side | Vehicle inner side | Vehicle inner side | Vehicle inner side | Vehicle inner side | Vehicle inner side | Vehicle inner side | Vehicle outer Side | Vehicle outer Side |
| Arrangement of radial direction protrusions on vehicle | — | Vehicle Outer Side | Vehicle Outer Side | Vehicle Outer Side | Vehicle Outer Side | Vehicle Outer Side | Vehicle Outer Side | Vehicle Outer Side | — | Vehicle inner side |
| Fuel economy improvement rate | 100.2 | 100.2 | 100.2 | 100.2 | 100.2 | 100.2 | 100.2 | 100.2 | 101 | 101.5 |

FIG. 30B

PNEUMATIC TIRE

RELATED APPLICATIONS

This application is a divisional of U.S. patent application Ser. No. 14/408,292, filed on Dec. 15, 2014, which is the National Stage of International Patent Application No. PCT/JP2013/067138, filed on Jun. 21, 2013, which claims the benefit of priority from Japan Patent Application No. 2012-175312, filed on Aug. 7, 2012.

TECHNICAL FIELD

The present technology relates to a pneumatic tire and particularly relates to a pneumatic tire by which air flow around a tire can be improved.

BACKGROUND

Conventionally, for example in Japanese Unexamined Patent Application Publication No. 2010-260378A, a pneumatic tire is disclosed in which a plurality of protrusions (projections) extending in the tire radial direction is provided at predetermined intervals in the tire circumferential direction on the tire side portion (tire side surface) on the inner side in the vehicle width direction when the tire is mounted on a vehicle, and a plurality of recesses is provided over the tire circumferential direction and the tire radial direction on the tire side portion on the outer side in the vehicle width direction when the tire is mounted on a vehicle. When mounted on a vehicle, air flows uniformly toward the rear on the outer side in the vehicle width direction, but on the inner side in the vehicle width direction, the tire is disposed within the tire house, and other components such as the axle and the like are disposed nearby, so the flow of the air is easily disturbed. According to this pneumatic tire, an air flow circulation promotion effect and flow rectification effect are obtained and the air resistance is reduced by the protrusions provided on the tire side portion on the inner side in the vehicle width direction where the air flow is easily disturbed, and turbulent flow is produced when the vehicle is traveling by the recesses provided on the tire side portion on the outer side in the vehicle width direction, the drag force that tends to pull the tire backward due to the low pressure portion produced to the rear of the tire when traveling is reduced, so the fuel consumption is improved.

By providing recesses on the tire side portion as in the pneumatic tire according to Patent Document 1 as described above, turbulence is generated around the periphery of the tire when the vehicle is traveling, so it is possible to reduce the air resistance of the tire itself, but the recesses make the shape of the tire side portion more complex. Therefore, the manufacturing cost of the tire could increase.

SUMMARY

With the foregoing in view, the present technology provides a pneumatic tire that is capable of effectively reducing the resistance of the tire as well as reducing the manufacturing cost.

A pneumatic tire according to a first example has a circumferential direction protrusion extending longitudinally mainly along the tire circumferential direction disposed on at least a first tire side portion outward in the tire radial direction from the maximum tire width position.

According to this pneumatic tire, the air passing the tire side portion is made turbulent by the circumferential direction protrusion. Therefore, a turbulent flow boundary layer is generated on the periphery of the pneumatic tire, so expansion of air that escapes the vehicle outer side to the rear of the vehicle is suppressed. As a result, the spread of the passing air is suppressed, the air resistance of the pneumatic tire is reduced, and the fuel economy can be improved. Moreover, the circumferential direction protrusion extends longitudinally mainly along the tire radial direction, so it has a comparatively simple structure. As a result, it is possible to suppress the complexity of the structure, and reduce the manufacturing cost of the pneumatic tire 1.

Also, the pneumatic tire according to a second example related to the first example, wherein the height that the circumferential direction protrusion protrudes from the tire side portion satisfies a range of not less than 3 mm and not more than 10 mm, and the width in the lateral direction satisfies a range of not less than 0.5 mm and not more than 5 mm.

According to this pneumatic tire, the circumferential direction protrusion appropriately contacts the flow of air, and thereby it is possible to obtain a more significant air turbulence effect due to the circumferential direction protrusion, and the air resistance of the pneumatic tire can be effectively reduced Also, the pneumatic tire according to a third example related to the first or second examples, wherein the circumferential direction protrusion is disposed on the first tire side portion, and a plurality of radial direction protrusions that extend longitudinally mainly along the tire radial direction is disposed on a second tire side portion.

According to this pneumatic tire, the air flow from the front to the rear of the vehicle is promoted and rectified by the radial direction protrusions. Therefore, turbulence of the air flow passing the vehicle inner side of the pneumatic tire is suppressed. As a result, the spread of the passing air is suppressed, so the air resistance of the vehicle is reduced, and the fuel economy can be further improved.

Also, the pneumatic tire according to a fourth example related to the third example, wherein the height that the radial direction protrusions protrude from the tire side portion satisfies the range of not less than 1 mm and not more than 10 mm, the number thereof disposed in the tire circumferential direction satisfies a range of not less than 10 and not more than 50, and the width in the lateral direction satisfies the range of not less than 0.5 mm and not more than 5 mm.

According to this pneumatic tire, the radial direction protrusions appropriately contact the flow of air, so it is possible to obtain a more significant air flow promotion effect and rectification effect due to the radial direction protrusions, and the air resistance of the vehicle can be effectively reduced.

Also, the pneumatic tire according to a fifth example related to any one of the first to fourth examples, wherein a vehicle inner/outer orientation when mounted on a vehicle is designated, and the circumferential direction protrusion is disposed on the tire side portion on the vehicle outer side.

According to this pneumatic tire, the air flow from the front to the rear of the vehicle is made turbulent by the circumferential direction protrusion on the vehicle outer side of the pneumatic tire, so a turbulent flow boundary layer is generated at the periphery of the pneumatic tire, and separation from the pneumatic tire is suppressed. Therefore, spreading of the air flow passing the vehicle outer side of the pneumatic tire is suppressed. As a result, the spread of the passing air is suppressed, so the air resistance of the pneumatic tire is reduced, and the fuel economy can be further improved.

The pneumatic tire according to the present technology is capable of effectively reducing the air resistance of the tire as well as reducing the manufacturing cost.

BRIEF DESCRIPTION OF THE DRAWINGS

FIGS. 30A-B include a table showing results of performance testing of pneumatic tires according to examples of the present technology.

DETAILED DESCRIPTION

An embodiment of the present technology is described below in detail based on the drawings. However, the present technology is not limited to these embodiments. The constituents of the embodiment include constituents that can be easily replaced by those skilled in the art and constituents substantially same as the constituents of the embodiment. Furthermore, a plurality of modified examples that are described in the embodiment can be freely combined within a scope of obviousness for a person skilled in the art.

Figure 1:
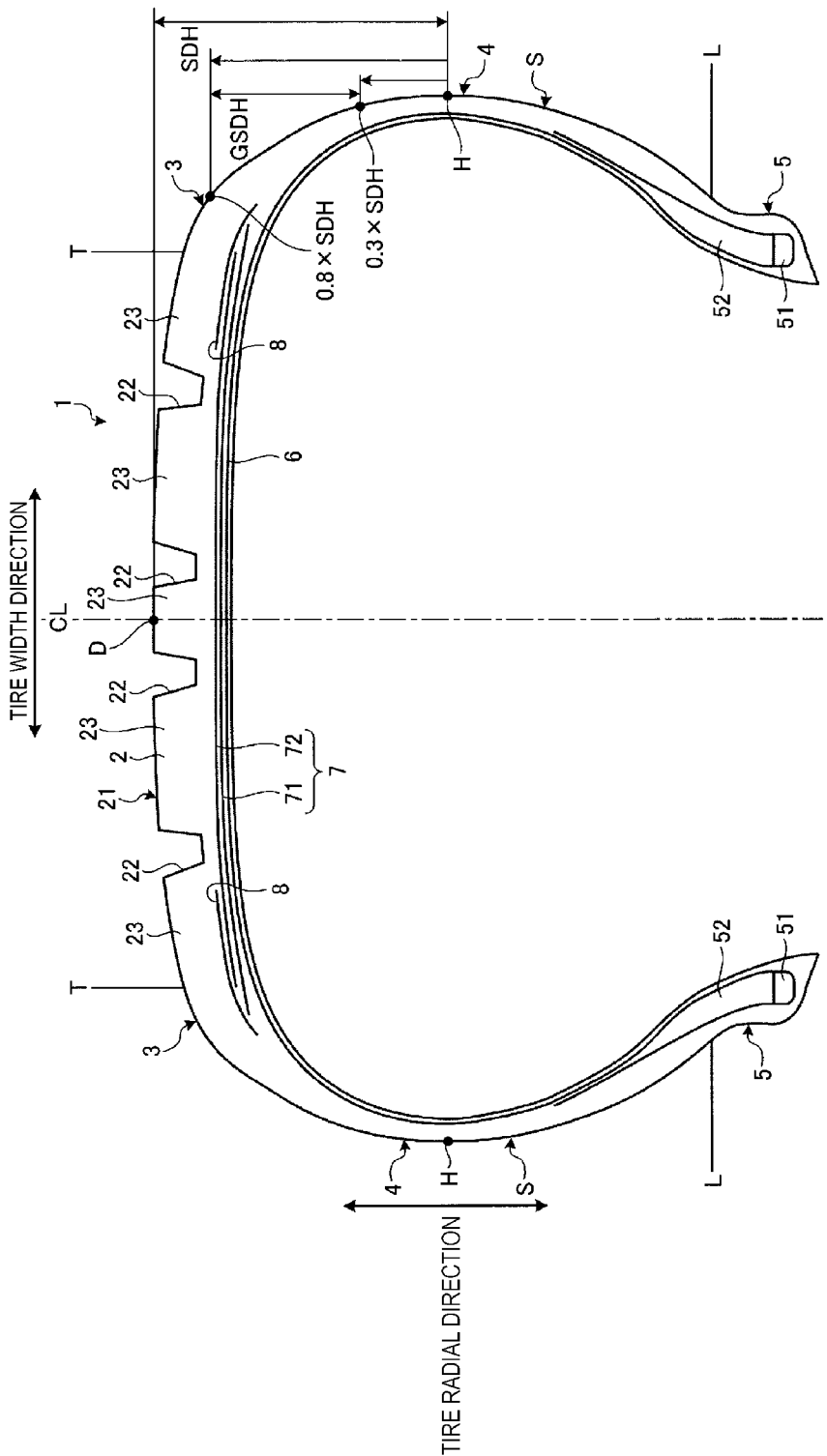
FIG. 1 is a meridian cross-sectional view of a pneumatic tire according to an embodiment of the present technology.

FIG. 1 is a meridian cross-sectional view of a pneumatic tire 1 according to the embodiment. In the following description, "tire radial direction" refers to a direction orthogonal to the rotational axis (not shown) of the pneumatic tire 1; "inner side in the tire radial direction" refers to the side facing the rotational axis in the tire radial direction; and "outer side in the tire radial direction" refers to the side distanced from the rotational axis in the tire radial direction. "Tire circumferential direction" refers to a circumferential direction with the rotational axis as a center axis. Additionally, "tire width direction" refers to the direction parallel to the rotational axis; "inner side in the tire width direction" refers to the side facing a tire equatorial plane CL (tire equator line) in the tire width direction; and "outer side in the tire width direction" refers to the side distanced from the tire equatorial plane CL in the tire width direction. "Tire equatorial plane CL" refers to a plane that is orthogonal to the rotational axis of the pneumatic tire 1 and that passes through a center of a tire width of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to a line along the tire circumferential direction of the pneumatic tire 1 that lies on the tire equatorial plane CL. In this embodiment, "tire equator line" is given the same "CL" reference symbol as that used for the tire equatorial plane.

As illustrated in FIG. 1, the pneumatic tire 1 of this embodiment includes a tread portion 2, shoulder portions 3 on both sides of the tread portion 2, and a side wall portion 4 and a bead portion 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and a surface thereof constitutes a profile of the pneumatic tire 1. A tread surface 21 is formed on a peripheral surface of the tread portion 2 or, rather, on a road contact surface that contacts a road surface when traveling. The tread surface 21 extends along the tire circumferential direction, and a plurality (four in this embodiment) of main grooves 22 that are straight main grooves parallel with the tire equator line CL are provided in the tread surface 21. Moreover, a plurality of rib-like land portions 23 extending along the tire circumferential direction and parallel with the tire equator line CL is formed in the tread surface 21 by the plurality of main grooves 22. Additionally, while not explicitly illustrated in the drawings, lug grooves that intersect with the main grooves 22 in each of the land portions 23 are provided in the tread surface 21. The land portions 23 are plurally divided in the tire circumferential direction by the lug grooves. Additionally, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are locations on both outer sides in the tire width direction of the tread portion 2. Additionally, the side wall portions 4 are exposed at an outermost side in the tire width direction of the pneumatic tire 1. The bead portions 5 include a bead core 51 and a bead filler 52. The bead core 51 is formed by winding a steel wire (bead wire) in a ring-like manner. The bead filler 52 is a rubber material that is disposed in space formed by ends of the carcass layer 6 in the tire width direction being folded up at a position of the bead core 51.

The ends of the carcass layer 6 in the tire width direction are folded over the pair of bead cores 51 from the inner side in the tire width direction to the outer side in the tire width direction, and the carcass layer 6 is stretched in a toroidal shape in the tire circumferential direction to form the framework of the tire. The carcass layer 6 is constituted by a plurality of carcass cords (not illustrated) disposed in parallel in the tire circumferential direction along the tire meridian direction having a given angle with respect to the tire circumferential direction, and covered by a coating rubber. The carcass cords are formed from organic fibers (e.g. polyester, rayon, nylon, or the like). At least one layer of this carcass layer 6 is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 are constituted by a plurality of cords (not illustrated) disposed in parallel at a predetermined angle with respect to the tire circumferential direction (e.g. from 20 degrees to 30 degrees), and covered by a coating rubber. The cords are formed from steel or organic fibers (e.g. polyester, rayon, nylon, or the like). Moreover, the overlapping belts 71 and 72 are disposed so that the cords thereof mutually cross.

The belt reinforcing layer 8 is disposed on the outer side in the tire radial direction that is the periphery of the belt layer 7, and covers the belt layer 7 in the tire circumferential direction. The belt reinforcing layer 8 is constituted by a plurality of cords (not illustrated), disposed in parallel in the tire width direction and substantially parallel (±5 degrees) to the tire circumferential direction, which are covered by a coating rubber. The cords are formed from steel or organic fibers (e.g. polyester, rayon, nylon, or the like). The belt reinforcing layer 8 illustrated in FIG. 1 is disposed so as to cover end portions in the tire width direction of the belt layer 7. The configuration of the belt reinforcing layer 8 is not limited to that described above. While not explicitly illustrated in the drawings, a configuration may be used where the belt reinforcing layer 8 is disposed so as to cover an entirety of the belt layer 7. Alternatively, for example, a configuration may be used where the belt reinforcing layer 8 has two reinforcing layers, where the belt reinforcing layer 8 is formed so that the reinforcing layer on the inner side in the tire radial direction is longer in the tire width direction than the belt layer 7 and disposed so as to cover the entirety of the belt layer 7, and the reinforcing layer on the outer side in the tire radial direction is disposed so as only to cover the end portions in the tire width direction of the belt layer 7. Alternatively, for example, a configuration may be used where the belt reinforcing layer 8 has two reinforcing layers, where each of the reinforcing layers is disposed so as only to cover the end portions in the tire width direction of the belt layer 7. In other words, the belt reinforcing layer 8 overlaps with at least the end portions in the tire width direction of the belt layer 7. Additionally, the belt reinforcing layer 8 is provided by winding band-like (e.g. with a width of 10 mm) strip material in the tire circumferential direction.

Figure 2:
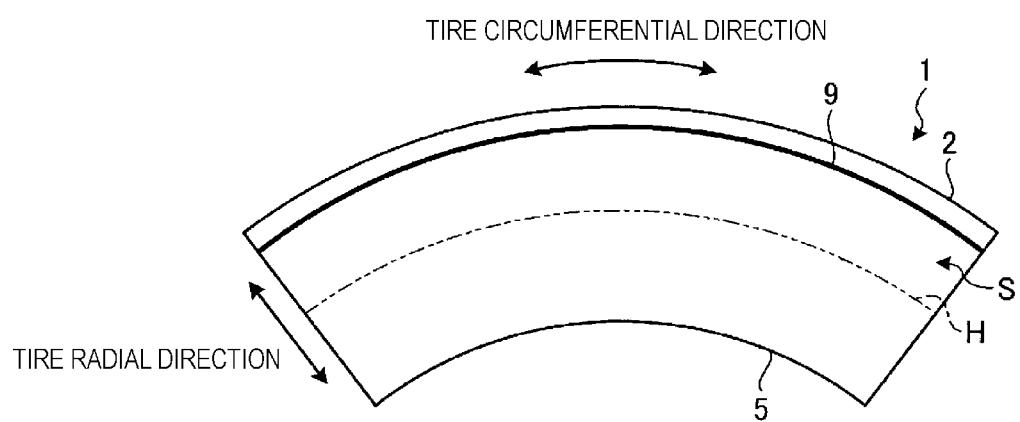
FIG. 2 is a partial appearance view of the pneumatic tire according to the embodiment of the present technology, viewed from a tire width direction.
Figure 3:
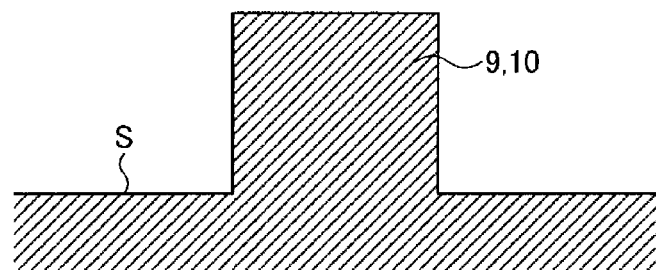
FIG. 3 is a cross-sectional view in the lateral direction of a protrusion.
Figure 4:
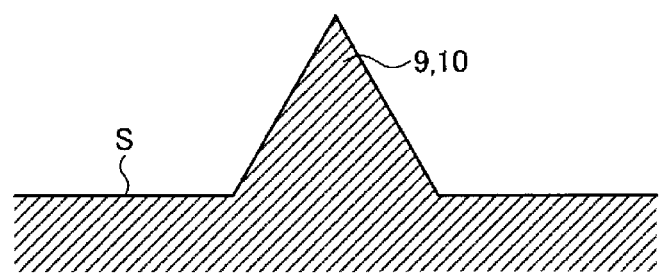
FIG. 4 is a cross-sectional view in the lateral direction of a protrusion.
Figure 5:
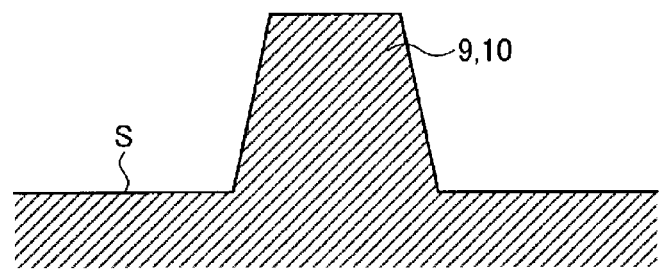
FIG. 5 is a cross-sectional view in the lateral direction of a protrusion.
Figure 6:
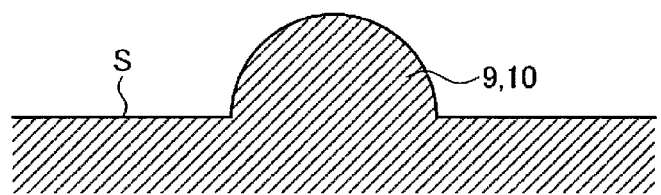
FIG. 6 is a cross-sectional view in the lateral direction of a protrusion.

FIG. 2 is an appearance view of the pneumatic tire according to the embodiment of the present technology, viewed from the tire width direction. With the pneumatic tire 1 configured as described above, as illustrated in FIG. 2, a circumferential direction protrusion 9 protruding outward of the tire from the surface of the tire side portion S is provided on the tire side portion S.

Here, the "tire side portion S" refers to, in FIG. 1, the outer side in the tire width direction from a ground contact edge T of the tread portion 2 or, in other words, a surface that uniformly continues in a range of the outer side in the tire radial direction from a rim check line L. Additionally, the "ground contact edge T" refers to both outermost edges in the tire width direction of a region in which the tread surface 21 of the tread portion 2 of the pneumatic tire 1 contacts the road surface when the pneumatic tire 1 is assembled on a regular rim and filled with regular inner pressure and 70% of a regular load is applied, and the ground contact edge T continues in the tire circumferential direction. Moreover, the "rim check line L" refers to a line used to confirm whether the tire has been assembled on the rim correctly and, typically, is an annular convex line closer to the outer side in the tire radial direction than a rim flange and continues in the tire circumferential direction along a portion adjacent to the rim flange on a front side surface of the bead portions 5.

Here, "Regular rim" refers to a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO.

As illustrated in FIG. 2, the circumferential direction protrusion 9 is provided over the range of the tire side portion S, outward in the tire radial direction from the maximum tire width position H. Also, the circumferential direction protrusion 9 is provided extending longitudinally mainly along the tire circumferential direction. Here, mainly in the tire circumferential direction means the direction that coincides with the tire circumferential direction as illustrated in FIG. 2, and means a direction that includes a component in the tire circumferential direction that is greater than a component in the tire radial direction (in other words, the angle with the tangent to the tire circumferential direction is less than 90°. The circumferential direction protrusion 9 illustrated in FIG. 2 is disposed as continuous in the tire circumferential direction which coincides with the tire circumferential direction. While not explicitly illustrated in the drawings, the circumferential direction protrusion 9 may be formed with a meandering shape or a zigzag shape that extends mainly along the tire circumferential direction.

Here, the maximum tire width position H is the position in the tire width direction that is largest when the pneumatic tire 1 is assembled onto a regular rim, and filled with the regular inner pressure under no load conditions.

Figure 7:
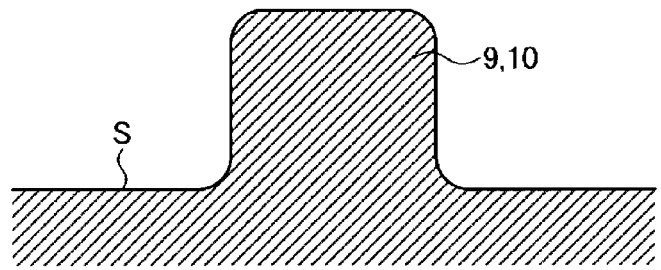
FIG. 7 is a cross-sectional view in the lateral direction of a protrusion.
Figure 8:
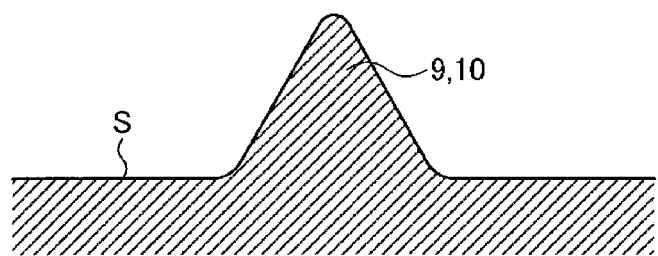
FIG. 8 is a cross-sectional view in the lateral direction of a protrusion.
Figure 9:
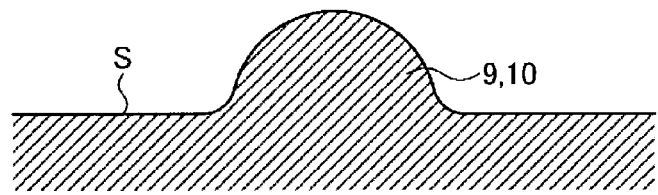
FIG. 9 is a cross-sectional view in the lateral direction of a protrusion.
Figure 10:
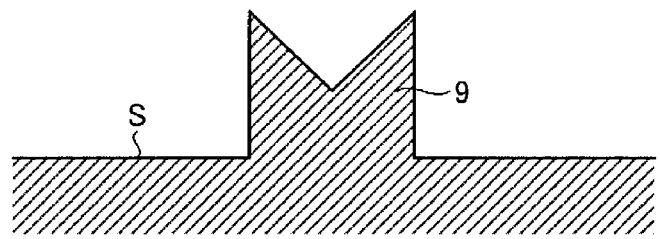
FIG. 10 is a cross-sectional view in the lateral direction of a protrusion.
Figure 11:
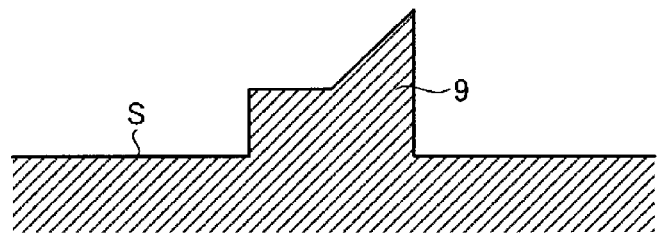
FIG. 11 is a cross-sectional view in the lateral direction of a protrusion.
Figure 12:
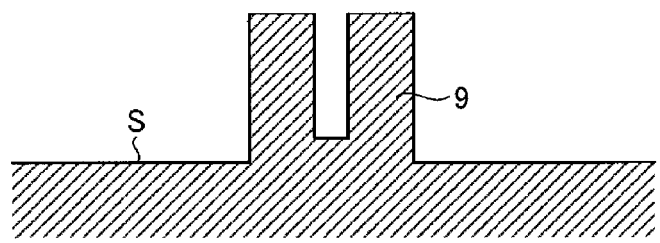
FIG. 12 is a cross-sectional view in the lateral direction of a protrusion.
Figure 13:
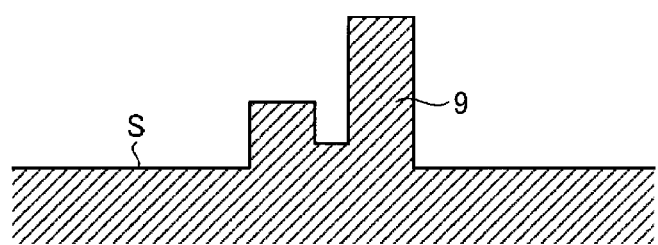
FIG. 13 is a cross-sectional view in the lateral direction of a protrusion.
Figure 14:
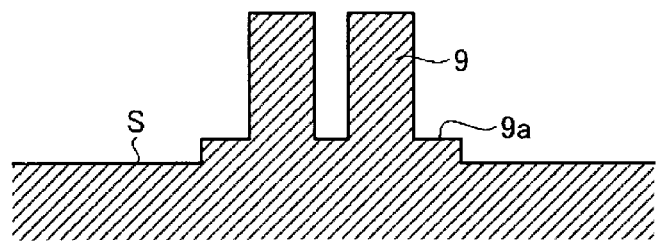
FIG. 14 is a cross-sectional view in the lateral direction of a protrusion.

Also, the circumferential direction protrusion 9 is formed so that, for example, its cross-sectional shape in the lateral direction has the cross-sectional shape in the lateral direction of the protrusions illustrated in FIGS. 3 to 14. The circumferential direction protrusion 9 illustrated in FIG. 3 has a rectangular cross-sectional shape in the lateral direction. The circumferential direction protrusion 9 illustrated in FIG. 4 has a triangular cross-sectional shape in the lateral direction. The circumferential direction protrusion 9 illustrated in FIG. 5 has a trapezoidal cross-sectional shape in the lateral direction. Also, the cross-sectional shape in the lateral direction of the circumferential direction protrusion 9 may have an external form based on curved lines. The circumferential direction protrusion 9 illustrated in FIG. 6 has a semicircular cross-sectional shape in the lateral direction. In addition, while not explicitly illustrated in the drawings, the cross-sectional shape in the lateral direction of the circumferential direction protrusion 9 may have various shapes such as, for example, a semi-elliptical shape or a semi-oval-shape. Also, the cross-sectional shape in the lateral direction of the circumferential direction protrusion 9 may have an external form that is a combination of straight lines and curves. The circumferential direction protrusion 9 illustrated in FIG. 7 has a cross-sectional shape in the lateral direction that is a rectangular shape whose corners are curved. The circumferential direction protrusion 9 illustrated in FIG. 8 has a cross-sectional shape in the lateral direction that is a triangular shape whose corners are curved. Also, as illustrated in FIGS. 7 to 9, the cross-sectional shape in the lateral direction of the circumferential direction protrusion 9 may have a shape in which the base portion that projects from the tire side portion S is curved. Also, the cross-sectional shape in the lateral direction of the circumferential direction protrusion 9 may be a combination of various shapes. The circumferential direction protrusion 9 illustrated in FIG. 10 has a rectangular shape with a plurality (2 in the case of FIG. 10) of triangular shapes in zigzag form on the top thereof. The circumferential direction protrusion 9 illustrated in FIG. 11 is formed pointed with a single triangular-shaped on the top of a rectangular shape. The circumferential direction protrusion 9 illustrated in FIG. 12 is formed with a rectangular shaped recess on the top of a rectangular shape. The circumferential direction protrusion 9 illustrated in FIG. 13 is formed with a rectangular shaped recess on the top of rectangular shape, with the protruding height on both sides of the recess formed differently. The circumferential direction protrusion 9 illustrated in FIG. 14 is formed with a rectangular shaped platform 9a projecting from the tire side portion S, and a plurality (2 in the case of FIG. 14) of rectangular shapes projecting on the top thereof. In addition, while not explicitly illustrated in the drawings, the cross-sectional shape in the lateral direction of the circumferential direction protrusion 9 may be various shapes such as a waveform on the top surface of rectangular shape.

Figure 15:
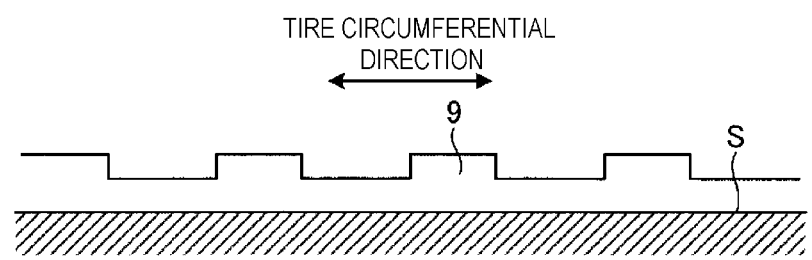
FIG. 15 is a side view in the longitudinal direction of the circumferential direction protrusion.
Figure 16:
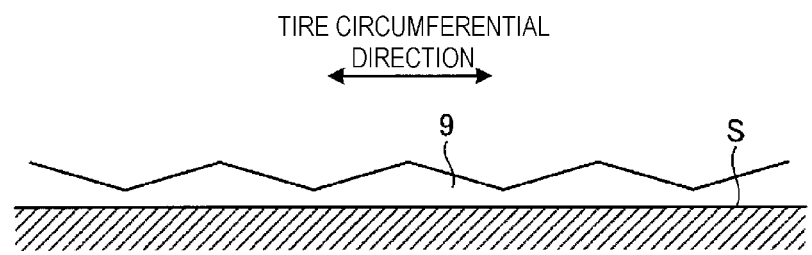
FIG. 16 is a side view in the longitudinal direction of the circumferential direction protrusion.

Also, the circumferential direction protrusion 9 may be formed with a uniform cross-sectional shape in the longitudinal direction (projection height from the tire side portion S or width in the lateral direction), or may be formed with a cross-sectional shape in the longitudinal direction (projection height from the tire side portion S) that varies, as illustrated in the side views in the longitudinal direction of the circumferential direction protrusion 9 in FIGS. 15 and 16. The circumferential direction protrusion 9 illustrated in FIG. 15 is formed so that the projection height from the tire side portion S is an irregular shape (comb tooth form) along the longitudinal direction. The circumferential direction protrusion 9 illustrated in FIG. 16 is formed so that the projection height from the tire side portion S is an irregular shape (zigzag shape) along the longitudinal direction. Also, while not explicitly illustrated in the drawings, the circumferential direction protrusion 9 may be formed so that the projection height from the tire side portion S is an irregular shape (wavy form) along the longitudinal direction. Also, while not explicitly illustrated in the drawings, the circumferential direction protrusion 9 may be formed so that the width in the lateral direction varies along the longitudinal direction.

Figure 17:
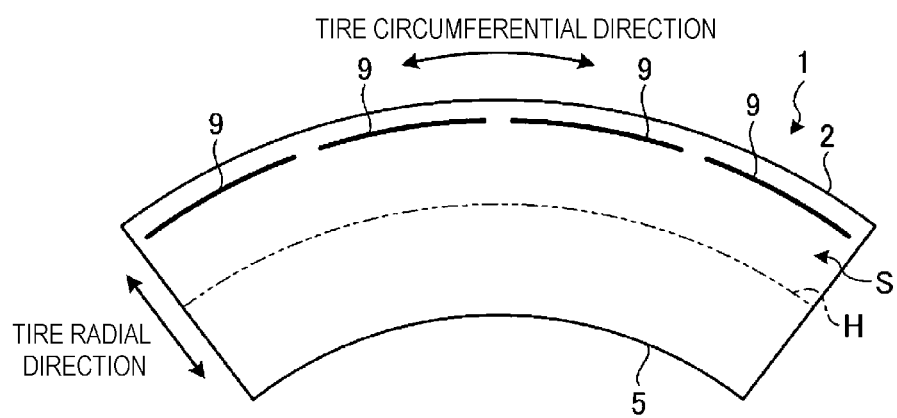
FIG. 17 is a partial appearance view of the pneumatic tire according to the embodiment of the present technology, viewed from the tire width direction.
Figure 18A:
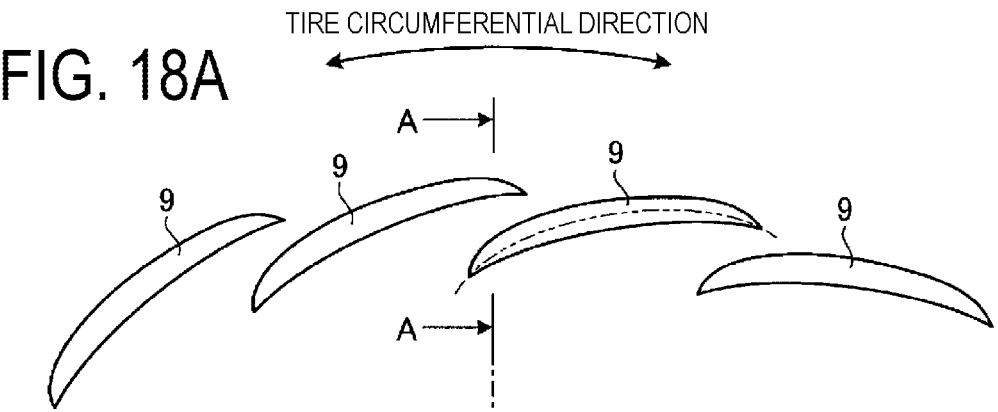
FIG. 18A is an appearance view of the circumferential direction protrusion.
Figure 18B:
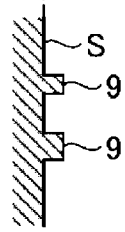
FIG. 18B is a cross-sectional view at A-A in FIG. 18A.
Figure 19A:
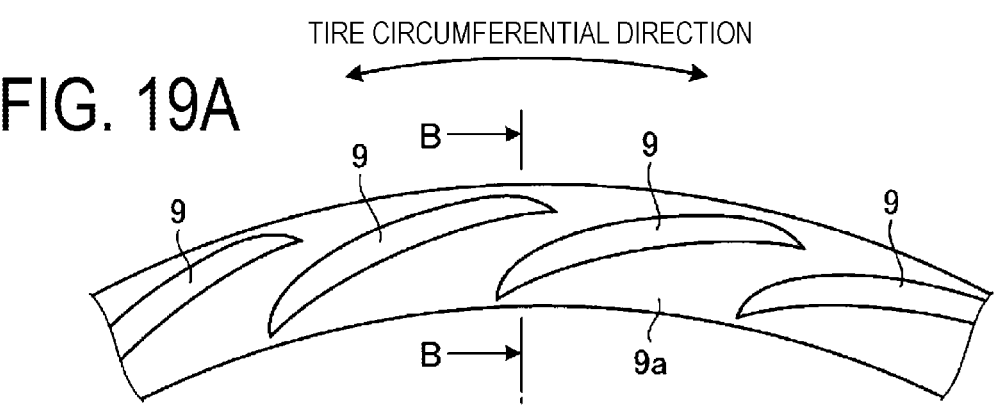
FIG. 19A is an appearance view of the circumferential direction protrusion.
Figure 19B:
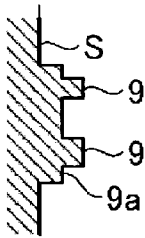
FIG. 19B is a cross-sectional view at B-B in FIG. 19A.

Also, the circumferential direction protrusion 9 may be formed divided in the longitudinal direction, as illustrated in the partial appearance view viewed from the tire width direction of the pneumatic tire according to an embodiment as illustrated in FIG. 17. The circumferential direction protrusion 9 that is formed divided may be formed inclined in the longitudinal direction with respect to the tire circumferential direction. In this case, the circumferential direction protrusion 9 includes a component in the tire circumferential direction that is greater than the component in the tire radial direction, in other words, is formed so that the angle with the tangent to the tire circumferential direction is less than 90°. Also, as illustrated in the appearance view of the circumferential direction protrusion in FIG. 18A, and the cross-section at A-A in FIG. 18A illustrated in FIG. 18B, the circumferential direction protrusion 9 is formed extending curved in the longitudinal direction, and the center line thereof in the longitudinal direction includes a component in the tire circumferential direction that is greater than the component in the tire radial direction, in other words, is formed so that the angle with the tangent to the tire circumferential direction is less than 90°. Also, as illustrated in the appearance view of the circumferential direction protrusion in FIG. 19A and the cross-sectional view at B-B in FIG. 19A illustrated in FIG. 19B, the longitudinal rectangular shaped platform 9a is formed protruding from the tire side portion S along the tire circumferential direction, and the circumferential direction protrusion 9 illustrated in FIG. 18 is formed protruding from the top of the platform 9a.

Also, in the tire width direction, the circumferential direction protrusion 9 may be provided on the tire side portion S on both sides, or it may be provided on the tire side portion S on one side.

In this way, in the pneumatic tire 1 according to the embodiment, the circumferential direction protrusion 9 is provided extending longitudinally mainly along the tire circumferential direction on the side outward in the tire radial direction from the maximum tire width position H on at least one tire side portion S.

According to this pneumatic tire 1, the air passing the tire side portion S is made turbulent by the circumferential direction protrusion 9. Therefore, a turbulent flow boundary layer is generated on the periphery of the pneumatic tire 1, so expansion of air that escapes the vehicle outer side to the rear of the vehicle is suppressed. As a result, the spread of the passing air is suppressed, the air resistance of the pneumatic tire 1 is reduced, and the fuel economy can be improved. Moreover, the circumferential direction protrusion 9 extends longitudinally mainly along the tire radial direction, so it has a comparatively simple structure. As a result, it is possible to reduce the complexity of the structure, and reduce the manufacturing cost of the pneumatic tire 1.

Also, in the pneumatic tire 1 according to the embodiment, as illustrated in FIG. 1, preferably, the circumferential direction protrusion 9 is disposed in a region GSDH that is located from the maximum tire width position H to the position from 30% to 80% of the tire radial direction dimension SDH between the maximum tire width position H and the tire maximum outer diameter.

The region GSDH as described above is a portion in which velocity in the tire rotational direction is large, and it is a portion in which it is difficult for the circumferential direction protrusion 9 to contact the road surface, so by providing the circumferential direction protrusion 9 here, it is possible to obtain a significant effect of reduction in the air resistance of the pneumatic tire 1 due to turbulence of the air, and to prevent damage to the circumferential direction protrusion 9 due to contact with the road surface.

Also, in the pneumatic tire 1 according to the present embodiment, preferably, the height that the circumferential direction protrusion 9 protrudes from the tire side portion S satisfies the range of not less than 3 mm and not more than 10 mm, and the width in the lateral direction satisfies the range of not less than 0.5 mm and not more than 5 mm.

Figure 20:
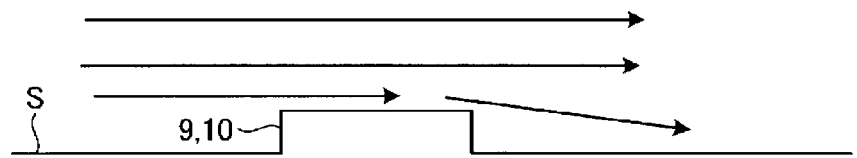
FIG. 20 is an explanatory drawing illustrating the flow of air around a protrusion having a height that is less than or equal to the prescribed range.
Figure 21:
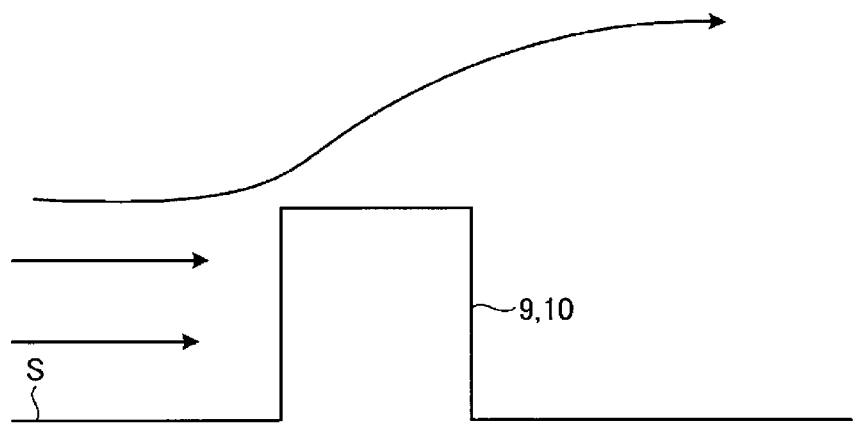
FIG. 21 is an explanatory drawing illustrating the flow of air around a protrusion having a height that is greater than or equal to the prescribed range.
Figure 22:
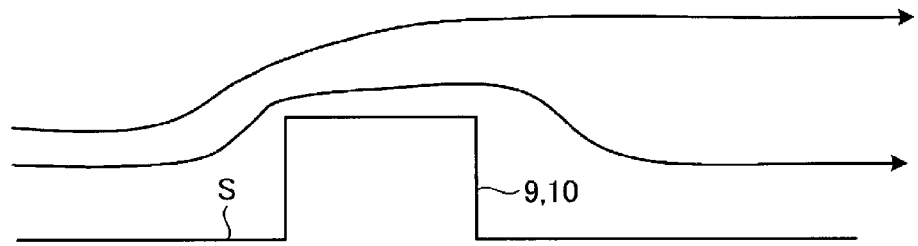
FIG. 22 is an explanatory drawing illustrating the flow of air around a protrusion having a height in the prescribed range.

If the height of the circumferential direction protrusion 9 is not more than 3 mm, as in the explanatory drawing of FIG. 20 which illustrates the air flow around a protrusion having a height that is not more than the prescribed range, the range over which the circumferential direction protrusion 9 contacts the air flow is small, so it is difficult to obtain a more significant air turbulence effect due to the circumferential direction protrusion 9. Also, if the height of the circumferential direction protrusion 9 exceeds 10 mm, as in the explanatory drawing of FIG. 21 that illustrates the flow of air around a protrusion having a height that is not less than the prescribed range, the range over which the circumferential direction protrusion 9 contacts the flow of air will be large, so the circumferential direction protrusion 9 will increase the air resistance and the air turbulence effect will be small. On this point, with the pneumatic tire 1 of the embodiment, as in the explanatory drawing of FIG. 22 that illustrates the flow of air around a protrusion having a height that is within the prescribed range, the circumferential direction protrusion 9 appropriately contacts the flow of air, and thereby it is possible to obtain a more significant air turbulence effect due to the circumferential direction protrusion 9, and the air resistance of the pneumatic tire 1 can be effectively reduced.

Figure 23:
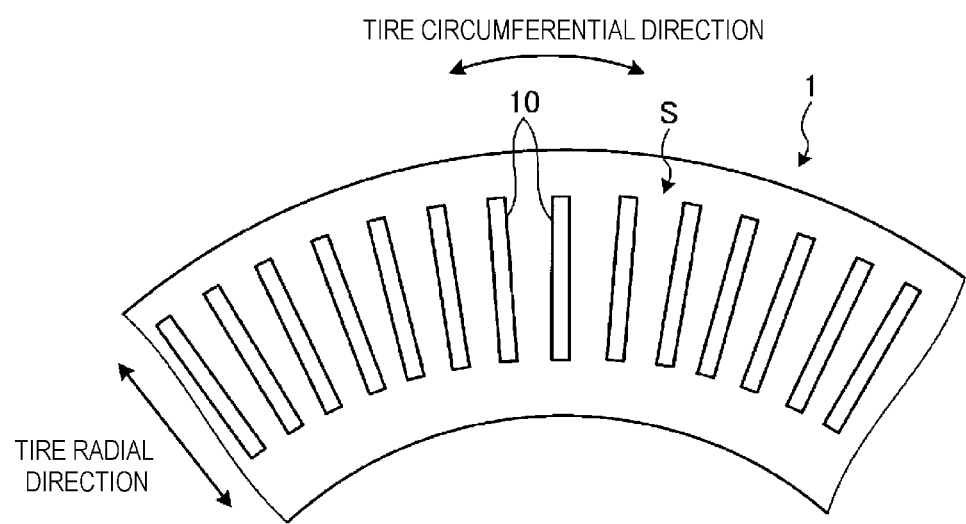
FIG. 23 is a partial appearance view of the pneumatic tire according to the embodiment of the present technology, viewed from a tire width direction.

Also, with the pneumatic tire 1 according to the embodiment, preferably, the circumferential direction protrusion 9 is disposed on the first tire side portion S, and, on the second tire side portion S, a plurality of radial direction protrusions 10 extending longitudinally mainly along the tire radial direction is disposed as illustrated in the partial appearance view viewed from the tire width direction of the pneumatic tire according to the embodiment illustrated in FIG. 23.

The radial direction protrusions 10 are, for example, as illustrated in FIG. 23, formed as protrusions made from a rubber material (may be the rubber material forming the tire side portion S or a rubber material different from that rubber material) in an elongated form, and are disposed in the tire circumferential direction at predetermined intervals in a range of the tire side portion S.

Here, mainly in the tire radial direction means a direction coinciding with the tire radial direction as illustrated in FIG. 23, and also means including a component in the tire radial direction that is greater than the component in the tire circumferential direction (in other words, the angle with the tire radial direction is less than 90°. The radial direction protrusions 10 illustrated in FIG. 23 are disposed coinciding with the tire radial direction. While not explicitly illustrated in the drawings, the radial direction protrusion 9 may be formed extending mainly in the tire radial direction while curving in a C-shape or bent in an L-shape, or formed with a meandering shape or a zigzag shape.

The radial direction protrusions 10 are formed so that, for example, their cross-sectional shape in the lateral direction has the cross-sectional shape in the lateral direction of the protrusions illustrated in FIGS. 3 to 9. The radial direction protrusion 10 illustrated in FIG. 3 has a rectangular cross-sectional shape in the lateral direction. The radial direction protrusion 10 illustrated in FIG. 4 has a triangular cross-sectional shape in the lateral direction. The radial direction protrusion 10 shown in FIG. 5 has a trapezoidal cross-sectional shape in the lateral direction. Also, the cross-sectional shape in the lateral direction of the radial direction protrusions 10 may have an external form based on curved lines. The radial direction protrusion 10 illustrated in FIG. 6 has a semicircular cross-sectional shape in the lateral direction. In addition, while not explicitly illustrated in the drawings, the cross-sectional shape of the radial direction protrusion 10 in the lateral direction may have various shapes such as, for example, a semi-elliptical shape or a semi-oval-shape. Also, the cross-sectional shape in the lateral direction of the radial direction protrusion 10 may have an external form that is a combination of straight lines and curves. The radial direction protrusion 10 illustrated in FIG. 7 has a cross-sectional shape in the lateral direction that is a rectangular shape whose corners are curved. The radial direction protrusion 10 illustrated in FIG. 8 has a cross-sectional shape in the lateral direction that is a triangular shape whose corners are curved. Also, as illustrated in FIGS. 7 to 9, the cross-sectional shape in the lateral direction of the radial direction protrusion 10 may have a shape in which the base portion that projects from the tire side portion S is curved.

Such radial direction protrusions 10 promote the flow of air past the tire side portion S, and also rectify it. Therefore, disturbance of the air flow passing the tire side portion S is suppressed. As a result, the air resistance of the pneumatic tire 1 is reduced, and the fuel economy can be improved.

In this way, according to the pneumatic tire 1 of the embodiment, the air resistance of the pneumatic tire 1 is reduced by the circumferential direction protrusion 9 disposed on the first tire side portion S, and the vehicle air resistance is reduced by the radial direction protrusions 10 disposed on the second tire side portion S. As a result, the fuel economy can be even further enhanced.

Figure 24:
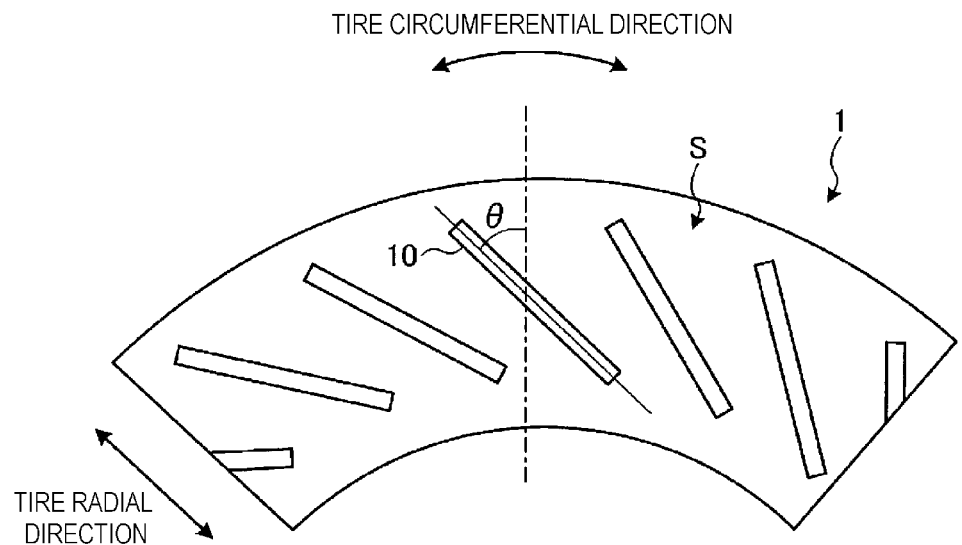
FIG. 24 is a partial appearance view of the pneumatic tire according to the embodiment of the present technology, viewed from the tire width direction.

As illustrated in FIG. 24 which illustrates a partial appearance view of the pneumatic tire according to the embodiment, viewed from the tire width direction, preferably, the inclination θ of the longitudinal direction of the radial direction protrusions 10 with respect to the tire radial direction satisfies the range of ±60°.

The longitudinal direction of the radial direction protrusion 10 is a straight line that connects both ends in the longitudinal direction of the radial direction protrusions 10, and the inclination of the straight line with respect to the tire radial direction satisfies the range of +60° to −60°.

According to this pneumatic tire 1, the strain in the radial direction protrusion 10 that occurs when the tire side portion S is bent in the tire circumferential direction or the tire radial direction is reduced by the inclination of the radial direction protrusion 10, so the durability of the radial direction protrusion 10 can be increased.

Figure 25:
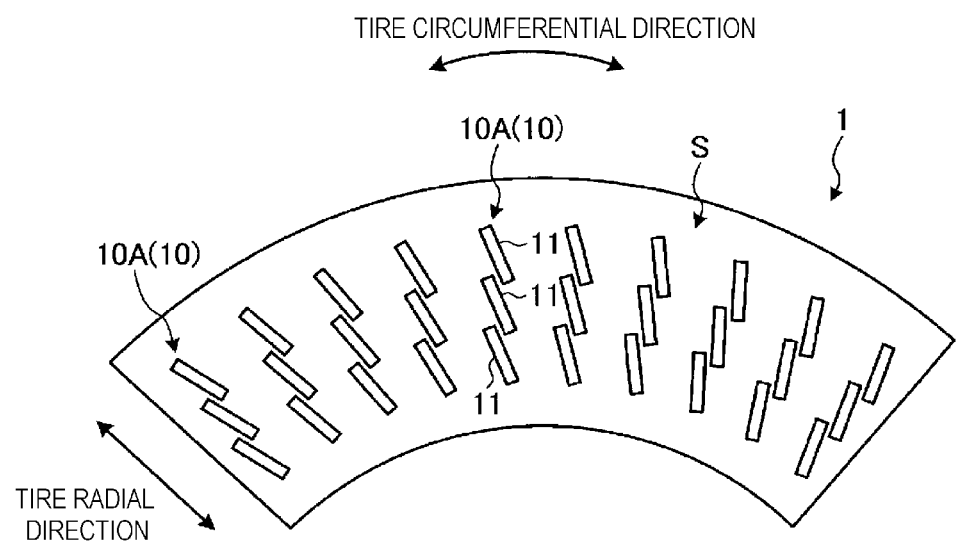
FIG. 25 is a partial appearance view of the pneumatic tire according to the embodiment of the present technology, viewed from the tire width direction.

Also, as illustrated in FIG. 25 which illustrates a partial appearance view of the pneumatic tire according to the embodiment, viewed from the tire width direction, preferably, the radial direction protrusions 10 are formed as a row of fins 10A that is divided into a plurality of fins 11 in the longitudinal direction, and in the row of fins 10A, the fins 11 overlap with each other in the tire circumferential direction and the tire radial direction, and extend overall in the tire radial direction.

In FIG. 25, the radial direction protrusions 10 are formed as rows of fins 10A divided into three fins 11 in the longitudinal direction, the projections of adjacent fins 11 overlap in the tire circumferential direction and the tire radial direction, extending overall in the tire radial direction. In FIG. 25, the fins 11 are disposed in sequence in one direction in the tire circumferential direction, but this is not a limitation. For example, while not explicitly illustrated in the drawings, the radial direction protrusions 10 may be formed as a row of fins 10A divided into three fins 11 in the longitudinal direction, and the fins 11 may be disposed in different directions from each other in the tire circumferential direction.

According to this pneumatic tire 1, the strain in the radial direction protrusions 10 that occurs when the tire side portion S is bent in the tire circumferential direction and the tire radial direction is reduced by the overlap of the fins 11, so the durability of the radial direction protrusions 10 can be increased.

As illustrated in FIG. 25, when the radial direction protrusions 10 are formed as rows of fins 10A divided into a plurality of fins 11 in the longitudinal direction, while not explicitly illustrated in the drawings, the longitudinal direction of the radial direction protrusion 10 is the straight line that connects the end on the inner side in the tire radial direction of the fin 11 on the innermost side in the tire radial direction and the end on the outer side in the tire radial direction of the fin 11 on the outermost side in the tire radial direction. Then, this longitudinal direction should be mainly along the tire radial direction, but may be inclined with respect to the tire radial direction in the range of +60° to −60°.

Also, in the pneumatic tire 1 according to the embodiment, preferably, the height that the radial direction protrusions 10 protrude from the tire side portion S satisfies the range of not less than 1 mm and not more than 10 mm, the number thereof disposed in the tire circumferential direction satisfies the range of not less than 10 and not more than 50, and the width in the lateral direction satisfies the range of not less than 0.5 mm and not more than 5 mm.

If the height of the radial direction protrusions 10 is less than 1 mm, as in the explanatory drawing of FIG. 20 which illustrates the air flow around a protrusion having a height that is not more than the prescribed range, the range over which the radial direction protrusions 10 contact the air flow is small, so it is difficult to obtain a more significant air flow promotion effect and rectification effect due to the radial direction protrusions 10. Also, if the height of the radial direction protrusions 10 exceeds 10 mm, as in the explanatory drawing of FIG. 21 that illustrates the flow of air around a protrusion having a height that is not less than the prescribed range, the range over which the radial direction protrusions 10 contact the flow of air will be large, so the radial direction protrusions 10 will increase the air resistance and the air flow promotion effect and rectification effect will be small. On this point, with the pneumatic tire 1 of this embodiment, as in the explanatory drawing of FIG. 22 that illustrates the flow of air around a protrusion having a height that is within the prescribed range, the radial direction protrusions 10 appropriately contact the flow of air, and thereby it is possible to obtain a more significant air flow promotion effect and rectification effect due to the radial direction protrusions 10, and the air resistance of the vehicle can be effectively reduced.

Also, when the number of radial direction protrusions 10 is less than 10, it is difficult to obtain the air flow promotion effect and the rectification effect. On the other hand, when the number of radial direction protrusions 10 exceeds 50, the radial direction protrusions 10 will increase the air resistance and the air flow promotion effect and the rectification effect becomes smaller, the tire mass increases, and the rolling resistance tends to increase. Therefore, preferably, the number of radial direction protrusions 10 is in the range of not less than 10 and not more than 50. In addition, when the width of the radial direction protrusions 10 is less than 0.5 mm, the radial direction protrusions 10 can easily deform and it becomes difficult to obtain the air flow promotion effect and the rectification effect. On the other hand, when the width of the radial direction protrusions 10 exceeds 5 mm, the radial direction protrusions 10 will increase the air resistance and the air flow promotion effect and the rectification effect become smaller, the tire mass increases, and the rolling resistance tends to increase. Therefore, preferably, the width of the radial direction protrusions 10 is in the range of not less than 0.5 mm and not more than 5 mm.

Also, preferably the pneumatic tire 1 of the embodiment has a designated vehicle inner/outer orientation when mounted on a vehicle, and the circumferential direction protrusion 9 is disposed on the tire side portion S on the vehicle outer side.

The designation of orientation with respect to the vehicle inner side and the vehicle outer side is, for example, indicated by an indicator provided on the side wall portion 4 (not explicitly illustrated in the drawings). Note that the designations of the vehicle inner side and the vehicle outer side are not limited to cases when mounted on the vehicle. For example, in cases when assembled on a rim, orientation of the rim with respect to the inner side and the outer side of the vehicle in the tire width direction is set. Therefore, in cases when the pneumatic tire 1 is assembled on a rim, the orientation with respect to the vehicle inner side and the vehicle outer side in the tire width direction is designated.

Figure 26:
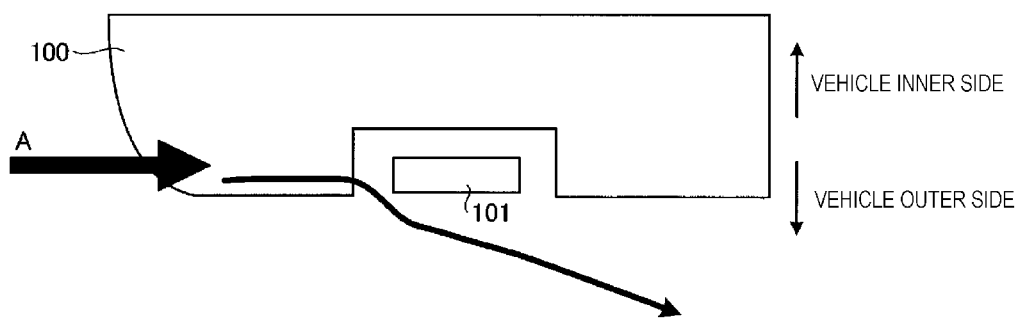
FIG. 26 is an explanatory drawing illustrating the flow of air around a normal pneumatic tire.

As illustrated in FIG. 26 which illustrates the flow of air around a normal pneumatic tire, a flow of air is produced in the direction of the arrow A in the drawings from the front to the rear of a vehicle 100 around a pneumatic tire 101 not having the circumferential direction protrusion 9 and the radial direction protrusions 10 due to driving the vehicle 100. Also, on the vehicle outer side of the pneumatic tire 101, the air flow A passes while spreading to the vehicle outer side. As a result, the air passing the side of the vehicle 100 spreads to the outer side, thereby increasing the air resistance with respect to the pneumatic tire 101.

Figure 27:
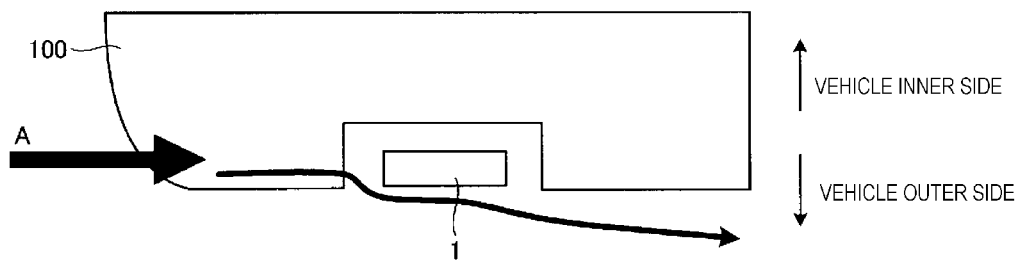
FIG. 27 is an explanatory drawing illustrating the flow of air around the pneumatic tire according to the embodiment of the present technology.

In contrast, as illustrated in FIG. 27 which illustrates the flow of air around the pneumatic tire according to this embodiment, with the pneumatic tire 1 in which the circumferential direction protrusion 9 is provided on the vehicle outer side, the air flow A from the front to the rear of the vehicle 100 is made turbulent by the circumferential direction protrusion 9 on the vehicle outer side of the pneumatic tire 1, so a turbulent flow boundary layer is generated at the periphery of the pneumatic tire 1, and separation from the pneumatic tire is reduced. Therefore, spreading of the air flow passing the vehicle outer side of the pneumatic tire 1 is suppressed. As a result, the spread of the passing air is suppressed, so the air resistance of the pneumatic tire 1 is reduced, and the fuel economy can be further improved.

Also, preferably, the pneumatic tire 1 according to the present embodiment has a designated vehicle inner/outer orientation when mounted on a vehicle, and the circumferential direction protrusion 9 is disposed on the tire side portion S on the vehicle outer side, and the radial direction protrusions 10 are disposed on the tire side portion S on the vehicle inner side.

Figure 28:
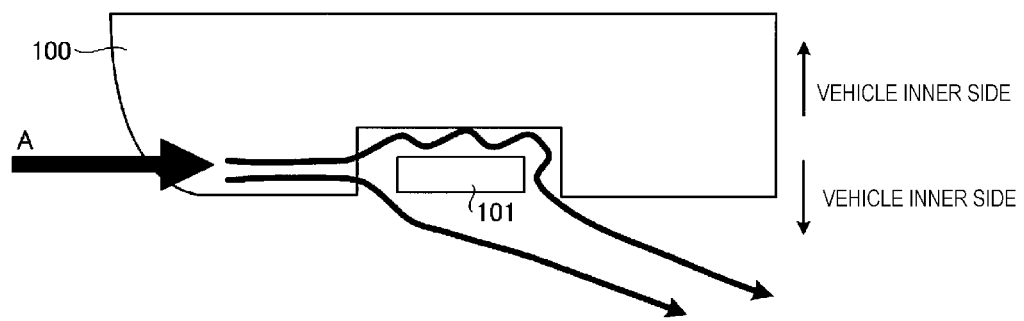
FIG. 28 is an explanatory drawing illustrating the flow of air around a normal pneumatic tire.

As illustrated in FIG. 28 which illustrates the flow of air around a normal pneumatic tire, a flow of air is produced in the direction of the arrow A in the drawings from the front to the rear of the vehicle 100 around a pneumatic tire 101 not having the circumferential direction protrusion 9 and the radial direction protrusions 10 due to driving the vehicle 100. Also, on the vehicle outer side of the pneumatic tire 101, the air flow A passes while spreading to the vehicle outer side. Also, this air flow produces turbulence between the pneumatic tire 101 and the vehicle 100 on the vehicle inner side of the pneumatic tire 101, and passes. As a result, the air passing the side of the vehicle 100 spreads to the outer side, thereby increasing the air resistance with respect to the pneumatic tire 101 and the vehicle 100.

Figure 29:
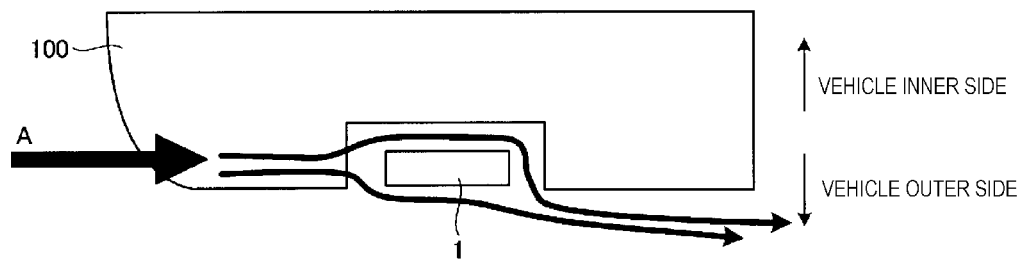
FIG. 29 is an explanatory drawing illustrating the flow of air around the pneumatic tire according to the embodiment of the present technology.

In contrast, as illustrated in FIG. 29 which illustrates the flow of air around the pneumatic tire according to this embodiment, with the pneumatic tire 1 in which the circumferential direction protrusion 9 is provided on the vehicle outer side and the radial direction protrusions 10 are provided on the vehicle inner side, the air flow A from the front to the rear of the vehicle 100 is made turbulent by the circumferential direction protrusion 9 on the vehicle outer side of the pneumatic tire 1, so a turbulent flow boundary layer is generated at the periphery of the pneumatic tire 1, and separation from the pneumatic tire is reduced. Therefore, spreading of the air flow passing the vehicle outer side of the pneumatic tire 1 is suppressed. As a result, the spread of the passing air is suppressed, so the air resistance of the pneumatic tire 1 is reduced, and the fuel economy can be further improved. On the other hand, on the vehicle inner side of the pneumatic tire 1, the air flow A from the front to the rear of the vehicle 100 is promoted and rectified by the radial direction protrusions 10. Therefore, turbulence of the air flow passing the vehicle inner side of the pneumatic tire 1 is suppressed. As a result, the spread of the passing air is suppressed, so the air resistance of the vehicle 100 is reduced, and the fuel economy can be further improved.

EXAMPLES

In the examples, performance tests for rate of improvement in fuel economy were performed on a plurality of types of pneumatic tires under different conditions (see FIGS. 30A-B).

In this fuel economy improvement rate performance testing, a pneumatic tire having a tire size of 195/65R15 was assembled on a regular rim and inflated to a regular inner pressure, then the pneumatic tire was mounted on a compact front-wheel drive vehicle having an engine displacement of 1,500 cc+ motor assist drive. The method of evaluating the fuel economy improvement rate was to measure the fuel economy for a case where the test vehicle described above was driven 50 laps on a 2 km (total length) test course at a speed of 100 km/h. Based on the measurement results, the fuel economy improvement rates were indexed with the index score of the pneumatic tire of the Conventional Example (100.0) being a reference. In this evaluation, larger index scores indicate enhanced fuel economy improvement rates.

In FIGS. 30A-B, the pneumatic tire of the Conventional Example did not include the circumferential direction protrusion and the radial direction protrusions. Also, the pneumatic tire of the Comparative Example included the radial direction protrusions.

In FIGS. 30A-B, the pneumatic tires of Working Examples 1 to 19 included the circumferential direction protrusion. Also, in the pneumatic tires according to Working Examples 5 to 19, the circumferential direction protrusion projection height and the width in the lateral direction were within the prescribed ranges. Working Examples 10 to 17 and 19 included the radial direction protrusions. In Working Examples 11 to 17 and 19, the radial direction protrusion projection height, the number in the tire circumferential direction, and the width in the lateral direction were within the prescribed ranges. In Working Example 18 and Working Example 19, the circumferential direction protrusion was disposed on the vehicle outer side, and in Working Example 19, the radial direction protrusions were disposed on the vehicle inner side.

As shown in the test results of FIGS. 30A-B, it is clear that the fuel economy improvement rate was enhanced with the pneumatic tires of Working Examples 1 to 19 by improving the air resistance.

What is claimed is:

1. A pneumatic tire, comprising:
a circumferential direction protrusion extending longitudinally mainly along a tire circumferential direction disposed in a first tire side portion outward in a tire radial direction from a maximum tire width position,
a plurality of radial direction protrusions that extend longitudinally mainly along the tire radial direction disposed on a second tire side portion, and
an indicator provided on a side wall portion and indicating a vehicle inner or outer side such that the first tire side portion is on the vehicle outer side when the tire mounted on a vehicle,
wherein:
the circumferential direction protrusion is formed divided in the longitudinal direction,
the circumferential direction protrusion is formed extending curved in the longitudinal direction,
a center line of divided portions of the circumferential protrusion in the longitudinal direction includes a component in the tire circumferential direction that is greater than the component in the tire radial direction,
a radial direction protrusion is not disposed on the first tire side portion, and a circumferential direction protrusion is not disposed on the second tire side portion,
a height that the circumferential direction protrusion protrudes from the first tire side portion satisfies a range of not less than 3 mm and not more than 10 mm, and a width in a lateral direction satisfies a range of not less than 0.5 mm and not more than 5 mm, a height that the radial direction protrusions protrude from the second tire side portion satisfies a range of not less than 1 mm and not more than 10 mm, a number of the radial direction protrusions disposed in the tire circumferential direction satisfies a range of not less than 10 and not more than 50, and a width of the radial direction protrusions in the lateral direction satisfies a range of not less than 0.5 mm and not more than 5 mm.

2. The pneumatic tire according to claim 1, wherein adjacent divided portions wrap each other in the tire circumferential direction.

3. The pneumatic tire according to claim 1, wherein a longitudinal platform is formed protruding from the first tire side portion along the tire circumferential direction, and the circumferential direction protrusion is formed protruding from the top of the platform.

4. The pneumatic tire according to claim 1, wherein a whole of the circumferential direction protrusion is disposed in a region that is located from a maximum tire width position to a position from 30% to 80% of the tire radial direction dimension between a maximum tire width position and the tire maximum outer diameter.

5. The pneumatic tire according to claim 1, wherein the circumferential direction protrusion has a shape in which a width is narrowed at both end portions in the longitudinal direction.

* * * * *